No. 777,159.

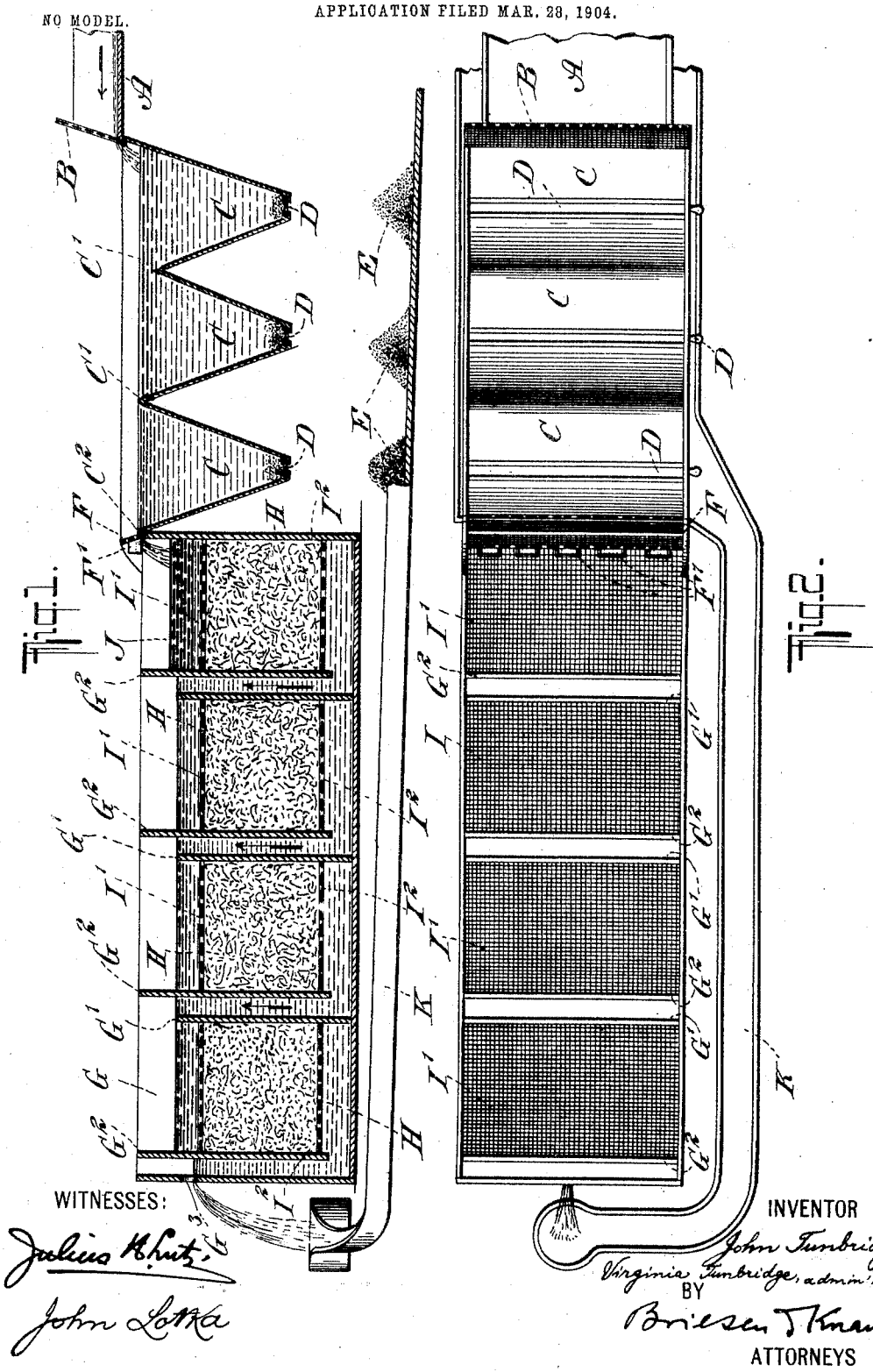

Patented December 13, 1904.

UNITED STATES PATENT OFFICE.

VIRGINIA TUNBRIDGE, OF NEWARK, NEW JERSEY, ADMINISTRATRIX OF JOHN TUNBRIDGE, DECEASED.

APPARATUS FOR RECOVERING PRECIOUS METALS.

SPECIFICATION forming part of Letters Patent No. 777,159, dated December 13, 1904.

Application filed March 28, 1904. Serial No. 200,501. (No model.)

*To all whom it may concern:*

Be it known that I, VIRGINIA TUNBRIDGE, a citizen of the United States, and a resident of Newark, in the county of Essex and State of New Jersey, am administratrix of the estate of JOHN TUNBRIDGE, deceased, late a citizen of the United States, and a resident of Newark, aforesaid, who in his lifetime did invent certain new and useful Improvements in Apparatus for Recovering Precious Metals, of which the following is a specification.

The said invention relates to apparatus for saving precious metals, and particularly gold and silver, from mining-waters which contain such metals in a floating condition. The recovery of such floating or suspended gold or silver has always proved a difficult problem. The passing of the waters containing such gold and silver through oleaginous bodies with subsequent filtration has been greatly improved in its efficiency by the present invention, which I will now proceed to describe in detail with reference to the accompanying drawings.

Figure 1 is a longitudinal section of an apparatus suitable for carrying out the invention, and Fig. 2 is a plan thereof.

The mining-waters containing gold or silver are admitted through a suitable channel or flume A and then passed through a screen B, preferably inclined backward, as shown, said screen being provided for the purpose of holding back any wood or other floating debris. The water then passes into the separator, which, as shown, may consist of a series of hoppers C, arranged in succession, and, if desired, the dividing-ridges C' between adjacent hoppers may be at progressively-higher levels toward the outlet of the separator. At the bottom of each separator-hopper may be located a valve D, controlling an outlet through which the sediment, such as sand, may be withdrawn. Such sediments will then form heaps under the separator, as indicated at E in Fig. 1. It will be understood that when the apparatus is started the mining-water will first fill the hopper C adjacent to the screen B until it rises to the level of the first ridge C'. Then the water will overflow into the second hopper and gradually rise to the level of the second ridge C', and thereupon the water will overflow into the third hopper and rise to the level of the overflow $C^2$. At this overflow or outlet is located a screen F, preferably inclined forward, and said screen is provided with suitable devices for holding soap. The soap-holding device may consist of pockets F', secured to the screen and open, so as to allow the liquid to come in contact with the soap. The mining-waters, freed from sediment and containing dissolved soap in consequence of their passage through the apparatus so far described, then flow from the outlet $C^2$ into the purifier and filter. This purifier and filter consists of a suitable tank G, containing upright partitions G' and depending partitions $G^2$. The outlet of the tank is indicated at $G^3$. The spaces between each depending partition $G^2$ and the upright partition G', which is nearer the outlet than said depending partition, are unobstructed, so that the water may flow freely upward in said spaces. The somewhat wider spaces in which the water is adapted to flow downward contain filtering material—for instance, excelsior, as indicated at H—said material being contained between a top screen I' and a bottom screen $I^2$. In the compartment which is adjacent to the outlet $C^2$ of the separator a layer of oil is provided to float above the filter proper, as indicated at J. Thus the water coming from the separator will first pass through the oil, and as the oil has a greater attraction for the floating gold or silver than water has the precious metal will be retarded, so that it may be caught more readily by the excelsior or other filtering material contained between the screens I' $I^2$. It will be observed that the filtering action takes place only during the downward movement of the water and not during the upward movement thereof, and it has been found that this arrangement of the material improves the efficiency of the filter. It will be understood that after the operation is completed the filtering material, with the gold adhering thereto, is removed and subjected to any suitable treatment, such as smelting, for recovering the precious metal. The waste water overflowing at the outlet G³ may, if desired, be utilized for carrying away the sediments withdrawn from the separator. This may be done by causing the overflow to pass into an inclined channel K, so arranged as to conduct the water against the heaped-up sediment E.

Various modifications may be made without departing from the nature of the above-described invention.

What I claim as the invention of JOHN TUNBRIDGE, deceased, and desire to secure by Letters Patent, is—

1. An apparatus of the class described, comprising a supply-channel having a backwardly-inclined screen at its discharge end, a separator arranged to receive the material from said supply-channel, and provided with a series of sediment-collecting hoppers having sediment-discharges and separated by ridges which are progressively higher toward the outlet, a forwardly-inclined screen located at the outlet of the separator and provided with means for holding soap, a filtering-tank connected with the outlet of the separator and provided with upright and depending partitions forming a series of upward and downward passages, filtering material located in the said downward passages, and a channel adapted to receive the overflow from the filter and to direct the said overflow against the sediment withdrawn from the separator.

2. An apparatus of the class described, comprising a supply-channel having a backwardly-inclined screen at its discharge end, a separator arranged to receive the material from said supply-channel, and provided with a series of sediment-collecting hoppers separated by ridges which are progressively higher toward the outlet, a forwardly-inclined screen located at the outlet of the separator and provided with means for holding soap, a filtering-tank connected with the outlet of the separator and provided with upright and depending partitions forming a series of upward and downward passages, and filtering material located in the said downward passages.

3. An apparatus of the character described, comprising a supply-channel, a screen at the end of said supply-channel, a separator connected with the outlet of said supply-channel, a screen located at the outlet of the separator and provided with means for holding soap, and a filter connected with the outlet of the separator.

4. In an apparatus of the character described, a sediment-separator connected with a source of water-supply, a screen and soap-holding means located at the outlet of said separator, and a filter connected with the outlet of said separator.

5. In an apparatus of the character described, a separator provided with sediment-discharging means and having soap-holding means at its outlet, in combination with a filter adapted to receive the liquid from the outlet of the separator.

6. An apparatus of the character described, comprising a supply-channel provided with a screen at its outlet, a sediment-separator connected with said outlet and provided at its own outlet with a screen and with soap-holding means, and a filter adapted to contain oil at its receiving end, and filtering material between said oil and the outlet of the filter.

In testimony whereof I have signed my name to this specification in the presence of two subscribing witnesses.

VIRGINIA TUNBRIDGE.

Witnesses:
CHAS. A. RUHLMANN,
CHAS. B. DUNCAN.